Aug. 16, 1927.

W. A. PITT 1,638,957

JOURNAL BEARING

Filed Dec. 21, 1925　　　3 Sheets-Sheet 1

WILLIAM A. PITT, INVENTOR

ATTORNEYS

Aug. 16, 1927.

W. A. PITT 1,638,957

JOURNAL BEARING

Filed Dec. 21, 1925

WILLIAM A. PITT
INVENTOR

ATTORNEYS

Aug. 16, 1927.
W. A. PITT
1,638,957
JOURNAL BEARING
Filed Dec. 21, 1925
3 Sheets-Sheet 3
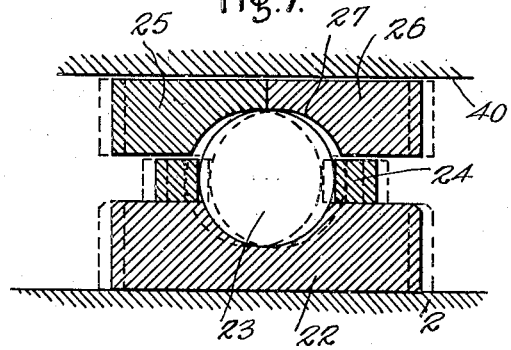
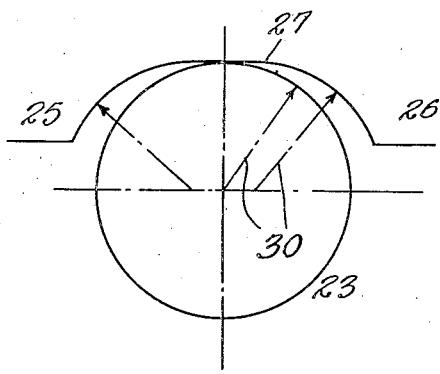
WILLIAM A. PITT
INVENTOR
ATTORNEYS Patented Aug. 16, 1927.

1,638,957

UNITED STATES PATENT OFFICE.

WILLIAM A. PITT, OF MONTREAL, QUEBEC, CANADA, ASSIGNOR OF ONE-HALF TO GEORGE F. SHEPPARD, OF MONTREAL, CANADA.

JOURNAL BEARING.

Application filed December 21, 1925. Serial No. 76,602.

My invention relates particularly to antifriction bearings to journals of railway rolling stock and the like.

The more important objects of the invention are as follows:

First:—To provide a bearing of this type into which it will be possible to project lubricant under pressure between the bearing surfaces of all the parts thereof and to maintain the lubricant in intimate contact with such parts at all times whether the rolling stock is idle or in motion thereby obtaining a constant uniform lubrication of the entire bearing and to confine the lubricant to those parts which require lubrication;

Secondly:—To provide a bearing of this type in which a limited axial travel of the journal both outwardly and inwardly would be permitted and the end thrust or axial stresses of the journal both outwardly and inwardly will be more uniformly taken up;

Thirdly:—To provide a bearing of this type which will be interchangeable with standard journal bearings now in service on the railroad;

Fourthly:—To provide a rugged construction which owing to its great strength and durability is better fitted to withstand the severe usage to which it is subject when in service than bearings of this type heretofore in use and in which the various parts will more efficiently perform their respective functions in withstanding the continuous changing relative positioning of the parts during travel; and finally to provide a construction which may be easily and quickly assembled and mounted upon or demounted from a journal.

For full comprehension, however, of my invention, reference must be had to the accompanying drawings in which similar reference characters indicate the same parts and wherein:

Figure 7 is a fragmentary detail sectional view of the end thrust bearing; and Figure 8 is a diagrammatic view illustrating the scope of movement of the end thrust bearing.

Figure 1:
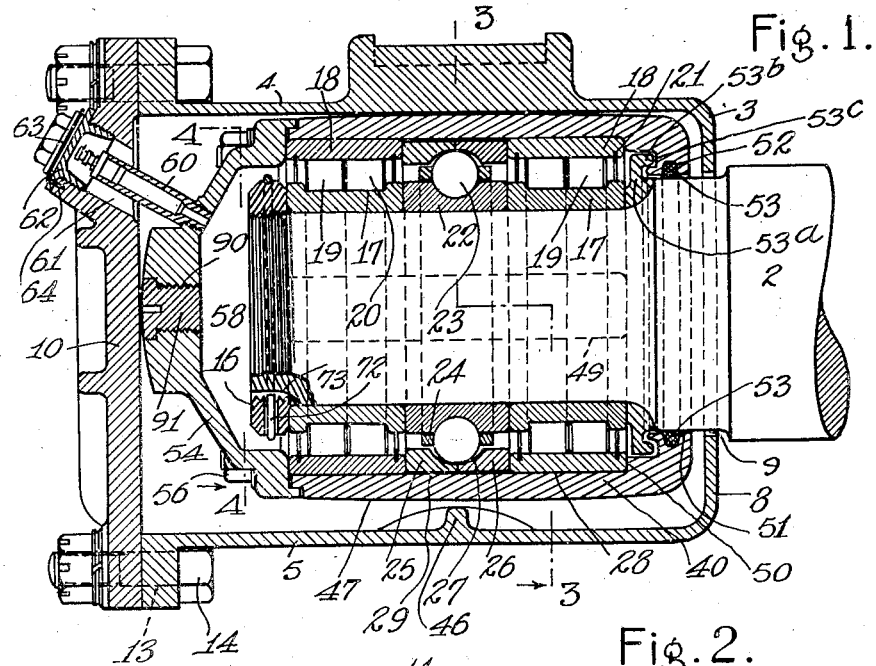
Figure 1 is a longitudinal vertical sectional view of a journal box and journal having my invention applied thereto.
Figure 2:
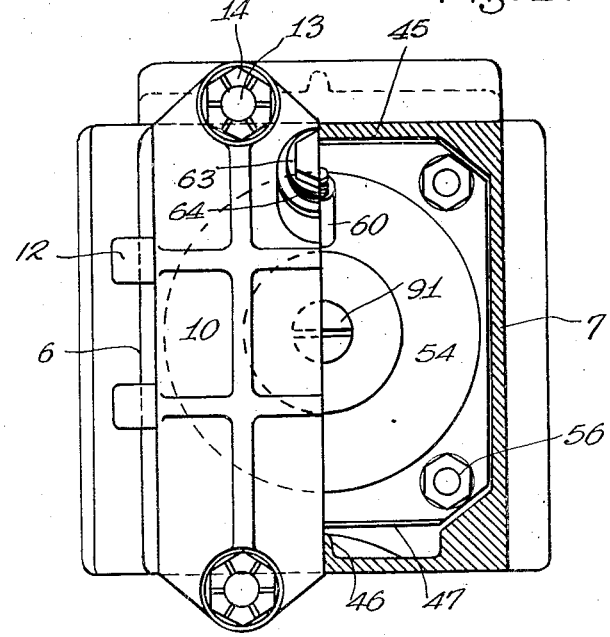
Figure 2 is an elevation of the box showing a portion of the cover removed.
Figure 3:
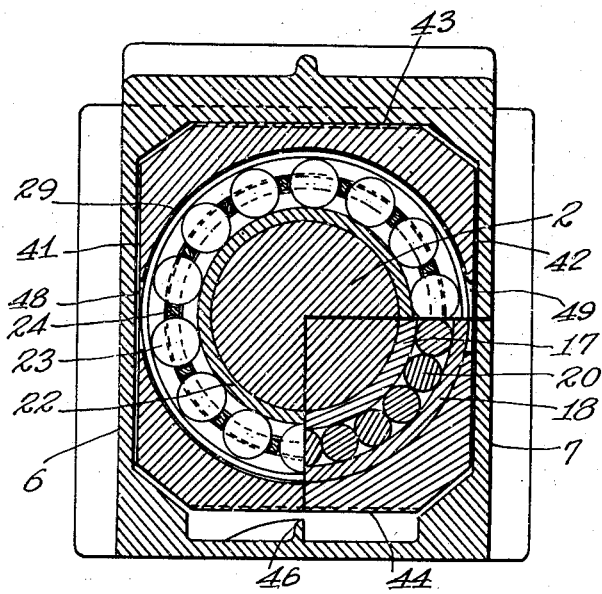
Figure 3 is a transverse vertical sectional view taken on line 3—3 Figure 1.
Figure 4:
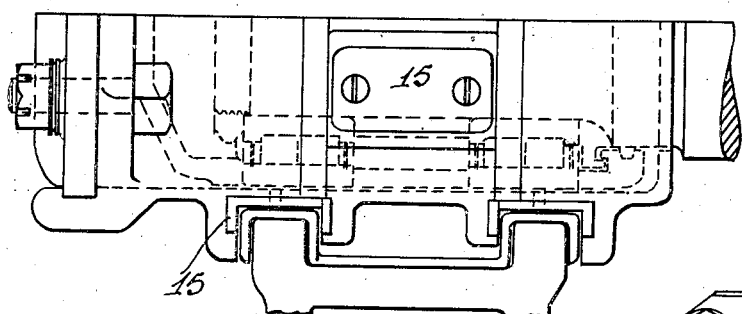
Figure 4 is a fragmentary plan view of the journal box shown in Figure 1.
Figure 5:
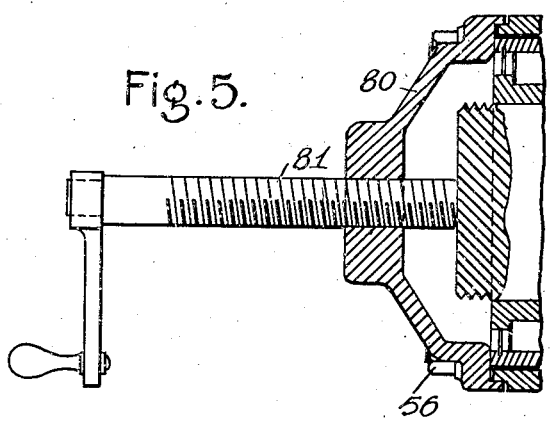
Figure 5 is a detail view illustrating the method of removing the bearing from the journal.
Figure 6:
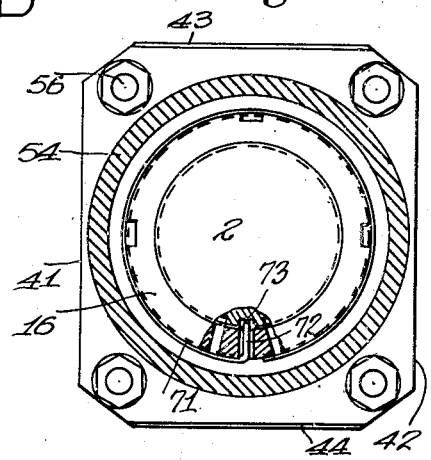
Figure 6 is a sectional view taken on line 4—4 Figure 1.

Referring to the accompanying drawings the journal of a car axle is indicated at 2 and the journal box at 3. The journal box is of substantially cubical form and consists of top and bottom walls 4 and 5, side walls 6 and 7, inner end wall 8 having a circular opening 9 therein through which a journal passes and a cover 10 which is slipped downwardly into position closing the open front of the journal between lugs 12 thereon. This cover is secured in place by bolts 13 and nuts 14 passed through lugs on the box and cover respectively. To reduce wear on the box to a minimum at the points at which it is engaged by the equalizer bars and the pedestal plate it is provided with hardened steel inserts 15.

My improved bearing consists of a pair of spaced radial load bearings encircling the journal and an end thrust bearing also encircling and located between the radial load bearings. These three bearings are secured in position upon the journal by a nut 16 which is screwed onto the threaded outer end of the journal and they are contained within a barrel housing having closed ends.

The radial load bearings are constructed alike in all respects and each consists of an inner raceway 17 constituted by a steel ring snugly encircling the journal and having a grooved periphery presenting a raceway, an outer raceway constituted by a ring 18 and two annular series of rollers 19 and 20, respectively, arranged with their ends abutting, the sum total length of the rollers being such that they snugly fit within the width of the groove in the inner raceway. Axial displacement of the rollers from the outer raceway is prevented prior to initial assembly by rings 21 which are inserted into grooves in the inner face of the outer raceway. These rings do not perform any function however after the bearing has been assembled in the journal box.

The end thrust bearing consists of an inner ring 22 having its ends in abutting relation with the adjacent ends of the ring 17 and having its periphery grooved to present a raceway for a series of ball bearings 23, the latter being maintained in their relative spacing by a cage 24 which snugly encircles the inner raceway 22. The outer raceway of this end thrust bearing is constituted by a ring divided into two parts 25 and 26 which together present an outer raceway 27 which is noramlly out of contact with the balls. It will be noted that the outer raceway of the radial load bearings are in load supporting engagement with the inner face 28 of the barrel housing but that such is not the case in the end thrust bearing, the latter does not bear any part of the radial load. The outside diameter of the rings 25 and 26 being slightly less than the inside diameter of the barrel so that a slight clearance therebetween as indicated at 29 is provided. The end thrust bearing is adapted to permit of limited axial travel of the journal inwardly and outwardly relatively to the barrel housing before the thrust is taken up. To this end the curvature of the bottom groove of the inner raceway 22 is described on a radius substantially the same as the radius of the balls as indicated at 30, and thus snugly conforms thereto, whereas the curvature of the outer raceway is such that sufficient clearance is provided at both sides of the balls to permit them to move in unison with the journal axially in either direction for a predetermined distance. This movement seldom exceeds one eighth of an inch either way. Notwithstanding the fact that there is clearance provided in the groove at both sides of the balls the radius of the curvature of the bottom of the groove 27 in the ring members 25 and 26 is the same as the radius of each of the balls so that when the end thrust causes the balls to engage either of these surfaces each ball will have a comparatively large area in contact therewith, and the thrust bearing is consequently able to withstand a comparatively heavy end thrust load.

As hereinbefore stated the radial load bearings and the axial thrust bearings just described are confined within a barrel housing. This housing which is indicated at 40 consists of a unitary member having circular external vertical sides 41 and 42 which snugly fit between the vertical side walls 6 and 7 of the journal box and external top and bottom sides 43 and 44 the former being in load supporting engagement with the flat underside 45 of the top of the journal box and the latter being spaced a slight distance from the bottom 5 of the journal box. upwardly projecting lug 46 formed on the bottom of the box limiting upward displacement of the box relatively to the journal, the inner side 47 of the barrel housing presenting a cylindrical chamber snugly enclosing the bearings. In the present embodient the outside diameter of the radial load bearings is only slightly less the inside width of the journal box and the housing has openings 48 and 49 on diametrically opposite points to provide clearings for the bearings where they come closest to the side walls of the box. These openings do not extend the full length of the housing but only a distance sufficient to accommodate the whole length of the bearing. Although of reduced thickness at the sides the barrel housing has great thickness at its top and bottom points and at its ends the inner end relatively to the journal is of increased thickness to present a seat or shoulder 50 for the bearings and has a central opening 51 through which the journal passes, the wall of the groove 52 to accommodate a felt pad 53 which bears tightly against the adjacent portion of the journal and prevents dirt and other foreign objects from working into the bearings. The opposite end of the housing is closed by a cap 54. This cap fits over the reduced outer end of the barrel as indicated at 55 and is bolted thereto as at 56. The dimensions of the cap are such that sufficient clearance 58 is provided between it and the adjacent end of the journal to permit of lubricant being forced therethrough to all parts of the bearing. In the present embodiment the lubricant is forced into the housing under pressure through a nipple 60 mounted in the cap and extending outwardly through an opening 61 in the journal box cover, such opening being closed by a plug 62 which is screwed into the opening and is locked in place by a spring ring lock 63, the lock encircling the plug and having a laterally bent end 64 extending through a hole in the plug into a socket in the adjacent portion of the cover.

From the foregoing description it will be seen that all the parts which require constant lubrication are completely contained within the closed housing, and that with a minimum amount of lubricant it is possible to lubricate all the bearing surfaces of the various parts, this is particularly desirable in the initial assembly as it is possible to force the grease or other lubricant under pressure into the housing from end to end and a constant and uniform lubrication is maintined whether the rolling stock is standing idle or in motion.

The top side 43 of the housing presents a convex bearing face which engages the flat underside of the top of the journal box and permits of a relative rocking motion between the journal and the box without in any way interfering with the functioning of the bearings contained within the housing.

The bottom 40 of the housing is also similarly constructed so that the latter housing may be inserted into the journal box with either of the sides 43 or 44 uppermost and in bearing relation with the flat underside of the journal box.

In the initial assembly of my improved bearing the journal box is first placed in position housing the journal and the barrel housing unit consisting of a barrel housing without its cap 54, spacing ring 70, radial load bearings and end thrust bearing is inserted into the journal box to position encircling the journal with the spacing collar 70 abutting against the shoulder at the inner end of the journal. After this unit has been mounted in position the nut 16 is screwed onto the threaded outer end of the journal and tightened until the inner raceway is clamped securely between the spacer ring 70 and the nut following which the nut is locked in place by spring ring locking member 71. This member is sprung over the nut into a groove in the periphery of the latter and one end indicated at 72 is bent inwardly through a hole in the nut into a slit or notch 73 in the journal end. The cap 54 of the barrel housing is then bolted upon the outer end of the latter following which the journal box cover 10 is slipped downwardly between the lugs to position closing the front of the journal box and is bolted thereto. After the cover has been mounted in place the nipple 60 is screwed into the cap in position with its outer end extending through the opening 61. The bearing thus assembled is now ready for lubrication and grease may be forced through the nipple under pressure into the spaces 58 within the housing cap and outwardly through the various bearings until the whole has been lubricated. Lubrication having been completed the plug 62 is screwed into position closing opening 61 and is locked in place by the locking member 63.

In removing the bearing from the journal the operation is reversed with the exception that after the cap 54 has been removed from the barrel housing and the nut 16 is removed from the journal the cap is replaced by what I prefer to term a pulling nut 80. This nut is bolted to the housing with the same bolts that fasten the cap in place and is adapted to travel axially along a screw 81 which is threaded through the nut and which when rotated manually or otherwise pulls the barrel housing unit as a whole off the journal.

An important feature of this construction and arrangement of parts is that the journal box may be constructed of a size which will conform with pedestal measurements now recognized as standard by the principal railroads. Heretofore anti-friction bearings which have been applied to standard journals have necessitated the use of a journal box which did not fit standard pedestal plates and the plates had consequently to be constructed specially to fit the box. This difficulty is overcome in the present invention.

What I claim is as follows:

1. The combination with a journal box closed on all sides except at its front and having a centrally located opening in its inner or rear side; a cover closing said front; a journal extending into the journal box through said opening to within close proximity of the cover but short of it; anti-friction radial load bearings encircling the journal and consisting of rings snugly encircling the journal and having grooved peripheral faces constituting inner raceways; means for securing the rings upon the journal consisting of a removable collar on the outer end of the journal; anti-friction devices adapted to run in said raceways, said devices being longitudinally movable in unison with the journal; and outer rings encircling the anti-friction devices and constituting outer raceways therefor, said last-mentioned rings permitting longitudinal movement of the anti-friction devices relatively thereto; and a hollow closed box-like container located within the journal box and enclosing the journal and anti-friction bearings, said container having a convex bearing surface in bearing relation with the journal box and said container and anti-friction bearings being constructed and arranged to be inserted to or withdrawn from position on the journal as a unit.

2. A journal bearing comprising a journal box, a journal extending into the journal box, spaced anti-friction radial load bearings encircling the journal, an anti-friction end thrust bearing encircling the journal and located between the radial load bearings, said end thrust bearing permitting limited axial movement of the journal relatively thereto, a closed housing contained within the journal box and completely enclosing the journal and said encircling bearings and constructed and arranged to permit a rocking action of the journal relatively to the journal box, and a removable collar mounted upon the outer end of the journal and preventing outward displacement of the bearings and housing relatively to the journal, said bearings and housing being constructed and arranged to be inserted to or withdrawn from position on the journal as a unit when the journal collar is removed.

3. The combination with a closed journal box, a journal extending through the rear wall of the box towards the front wall thereof but short of the latter, spaced anti-friction radial load bearings encircling the journal, and an end thrust bearing encircling the journal and located between the radial load bearings, said end thrust bearing permitting limited axial movement of the journal relatively thereto.

4. The combination with a closed journal box, a journal extending through the rear wall of the box towards the front wall thereof but short of the latter, spaced anti-friction radial load bearings encircling the journal, an end thrust bearing encircling the journal and located between the radial load bearings, said end thrust bearing permitting limited axial movement of the journal relatively thereto, and a second closed box completely enclosing the journal and said encircling bearings, said box being constructed and arranged to permit a rocking action of the journal relatively to the journal box.

5. The combination with a closed journal box, a journal extending through the rear wall of the box towards the front wall thereof but short of the latter, spaced anti-friction radial load bearings encircling the journal, an end thrust bearing encircling the journal and located between the radial load bearings, said end thrust bearing permitting limited axial movement of the journal relatively to the journal box both inwardly and outwardly.

6. A bearing of the type described consisting of a pair of spaced radial load bearings, each consisting of inner and outer raceways and roller bearings therebetween; and an end thrust bearing located between the radial load bearings and consisting of inner and outer raceways and ball bearings therebetween; the ball bearings being held in one of the raceways against endwise movement but being free to move relatively to the other raceway to a limited extent in an endwise direction.

7. The combination with a journal box having an open front and a cover for closing said front, said cover having a passage therethrough and a removable closure for said passage, a journal in the journal box, anti-friction bearings encircling the journal, a closed housing encircling the bearings and completely enclosing the same and the journal and permitting a rocking action of the journal relatively to the journal box, and a lubricating nipple mounted in the housing with its outer end extending inwardly into the passage in the journal box cover, said nipple communicating with the interior of the housing.

8. A bearing unit for the journal of a car axle consisting of a hollow member externally having substantially flat vertical sides and correspondingly shaped top and bottom sides, each of said top and bottom sides being flat in transverse section and convex in longitudinal section, and said member having a cylindrical chamber the diameter of which is approximately equal to the outside width of the member, said member having an inner end wall with a central opening for the journal and longitudinal openings in its side walls at the points at which the inside cylindrical surface of the member comes closest to the outside vertical surfaces of the latter, and means for completely closing the outer or front end of the member consisting of a removable cap.

9. In a bearing of the type described, a journal box, a journal extending into the journal box and being of uniform diameter throughout its length and having a shoulder at its inner end and an externally threaded outer end, a unit adapted to be inserted to or withdrawn from position encircling the journal, said unit consisting of spaced anti-friction radial load bearings comprising rings snugly encircling the journal and having grooved peripheral faces constituting inner raceways, rollers running in the grooves and held against endwise movement therein relatively to the journal, outer raceways encircling the rollers and permitting endwise movement of the latter relatively to such outer raceways, an end thrust bearing located between the radial load bearings and consisting of a ring snugly encircling the journal and in abutting relation with the first-mentioned inner raceways and having a groove in its peripheral face constituting an inner raceway, ball bearings snugly fitting said groove and fixed against endwise movement therein relatively to the journal, and an outer raceway constituted by a pair of internally grooved ring members encircling the series of ball bearings, said ring members combining in presenting a raceway permitting limited axial movement of the ball bearings in opposite directions, a housing encircling the journal and said encircling bearings and having a convex top permitting a rocking action of the journal relatively to the journal box, a nut screwed onto the outer end of the journal and adapted to clamp the inner rings of the bearings in position thereon and a removable cap mounted upon the outer end of the housing and adapted to clamp the outer rings of the bearings in position therein, and a collar encircling the inner end of the journal within the housing and interlocking with the inner end of the housing.

10. In a bearing of the type described, a journal box, a journal extending into the journal box, anti-friction radial load and end thrust bearings encircling the journal, a housing enclosing the journal and said bearings, and means on said housing enabling the housing and bearings to be withdrawn from the journal as a unit.

11. In a bearing of the type described an anti-friction end thrust bearing comprising inner and outer race-ways and ball bearings therebetween, the ball bearings being held in one of the race-ways against independent endwise movement relatively thereto, and being free to move independently of the other race-way to a limited extent in a straight longitudinal axial direction substantially as described.

12. In a bearing of the type described the combination with a journal; of an anti-friction end thrust bearing for the journal, said bearing including a race-way and a series of ball bearings adapted to run therein, said ball bearings being free to move in a straight longitudinal axial direction independently of the race-way to permit longitudinal axial movement of the journal, and said race-way being constructed and arranged to limit said independent movement of the balls, substantially as described.

In testimony whereof I have signed my name to this specification.

WILLIAM A. PITT.